(12) United States Patent
Smirnov

(10) Patent No.: US 11,209,298 B2
(45) Date of Patent: Dec. 28, 2021

(54) THERMAL MASS FLOW SENSOR WITH IMPROVED ACCURACY

(71) Applicant: Hitachi Metals, Ltd., Tokyo (JP)

(72) Inventor: Alexei V. Smirnov, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 15 days.

(21) Appl. No.: 16/374,508

(22) Filed: Apr. 3, 2019

(65) Prior Publication Data

US 2019/0331515 A1   Oct. 31, 2019

Related U.S. Application Data

(60) Provisional application No. 62/663,612, filed on Apr. 27, 2018.

(51) Int. Cl.
| | | |
|---|---|---|
| *G01F 1/696* | (2006.01) | |
| *G05D 7/06* | (2006.01) | |
| *G01K 7/14* | (2006.01) | |
| *G01K 7/42* | (2006.01) | |
| *G01F 1/684* | (2006.01) | |

(52) U.S. Cl.
CPC ......... *G01F 1/6965* (2013.01); *G05D 7/0635* (2013.01); *G01F 1/6847* (2013.01); *G01K 7/14* (2013.01); *G01K 7/42* (2013.01)

(58) Field of Classification Search
CPC .................................................. G01F 1/6965
See application file for complete search history.

(56) References Cited

U.S. PATENT DOCUMENTS

| | | | |
|---|---|---|---|
| 5,129,418 A | | 7/1992 | Shimomura et al. |
| 5,317,910 A | * | 6/1994 | Steinbrenner ........... G01F 1/698 73/114.34 |
| 5,911,238 A | * | 6/1999 | Bump ................... G01F 1/6842 137/486 |

(Continued)

FOREIGN PATENT DOCUMENTS

| | | |
|---|---|---|
| JP | H0756636 A | 3/1995 |
| JP | 200282722 A | 3/2002 |

OTHER PUBLICATIONS

"Exponential Smoothing." Wikipedia. Wikimedia Foundation, Mar. 23, 2018. Web. Sep. 10, 2020. <https://en.wikipedia.org/w/index.php?title=Exponential_smoothing&oldid=832060289>. (Year: 2018).*

(Continued)

*Primary Examiner* — Robert K Arundale
*Assistant Examiner* — Richard K. Durden
(74) *Attorney, Agent, or Firm* — Neugeboren O'Dowd PC

(57) ABSTRACT

Mass flow controllers and methods for controlling mass flow controllers are disclosed. A method includes providing a gas through a thermal mass flow sensor of the mass flow controller and processing a flow sensor signal from the thermal mass flow sensor of the mass flow controller to produce a measured flow signal. The measured flow signal is corrected to produce a corrected flow signal by gradually changing non-linearity correction to the measured flow signal when a flow rate of the gas changes. A valve of the mass flow controller is controlled using the corrected flow signal and a setpoint signal.

18 Claims, 10 Drawing Sheets

(56) References Cited

U.S. PATENT DOCUMENTS

| | | | | |
|---|---|---|---|---|
| 5,944,048 A | * | 8/1999 | Bump | G01F 1/6842 |
| | | | | 137/486 |
| 6,389,364 B1 | | 3/2002 | Vyers | |
| 7,565,255 B2 | | 7/2009 | Kanke et al. | |
| 8,068,999 B2 | | 11/2011 | Wang et al. | |
| 8,485,219 B2 | | 7/2013 | Goto et al. | |
| 2002/0103596 A1 | * | 8/2002 | Zhu | F02D 41/1401 |
| | | | | 701/115 |
| 2004/0002821 A1 | * | 1/2004 | Kanke | G01F 1/6845 |
| | | | | 702/45 |
| 2005/0000981 A1 | | 1/2005 | Peng et al. | |
| 2007/0276545 A1 | * | 11/2007 | Smirnov | G05D 7/0635 |
| | | | | 700/282 |
| 2008/0295892 A1 | * | 12/2008 | Takahashi | G05D 7/0635 |
| | | | | 137/87.03 |
| 2009/0312876 A1 | * | 12/2009 | Yoneda | G05D 7/0635 |
| | | | | 700/282 |
| 2013/0146148 A1 | * | 6/2013 | Smirnov | F17D 1/16 |
| | | | | 137/13 |
| 2014/0246097 A1 | | 9/2014 | Smirnov | |
| 2014/0257720 A1 | * | 9/2014 | Smirnov | G01F 15/002 |
| | | | | 702/45 |
| 2016/0281723 A1 | * | 9/2016 | Zhang | H02P 6/16 |
| 2017/0167912 A1 | | 6/2017 | Okano | |

OTHER PUBLICATIONS

Yamamura, Hidemasa, "International Search Report and Written Opinion Regarding International Application No. PCT/JP2019/016866", Jun. 20, 2019, p. 10, Published in: JP.

\* cited by examiner

THERMAL MASS FLOW SENSOR WITH IMPROVED ACCURACY

CLAIM OF PRIORITY UNDER 35 U.S.C. § 119

The present Application for Patent claims priority to Provisional Application No. 62/663,612 entitled "THERMAL MASS FLOW SENSOR WITH IMPROVED ACCURACY" filed Apr. 27, 2018, and assigned to the assignee hereof and hereby expressly incorporated by reference herein.

BACKGROUND

Field

The present invention relates to mass flow sensors and mass flow controllers, and in particular, but not by way of limitation, the present invention relates to improving an accuracy of mass flow sensors.

Background

A typical mass flow controller (MFC) is a device that sets, measures, and controls the flow of a gas in industrial processes such as thermal and dry etching among other processes. An important part of an MFC is a thermal flow sensor that measures the mass flow rate of the gas flowing through the device.

As opposed to an idealized flow sensor signal (that has a perfect linear dependence upon a mass flow rate of the gas) a flow sensor signal that is output by a thermal flow sensor is non-linear relative to an actual flow rate of the fluid: a sensitivity of the thermal flow sensor drops at higher flow rates as shown in FIG. 8. In other words, sensitivity of the flow sensor signal to the flow is not constant—it decreases with increasing flow. As used herein, sensitivity refers to the ratio of the flow sensor signal to the mass flow rate of the gas being measured.

In a typical mass flow controller, the nonlinearity of the thermal flow sensor is characterized during calibration under steady-state conditions, and then stored as nonlinearity data in a memory of the MFC in the form of a table. Then, a flow signal from the thermal flow sensor is adjusted using the nonlinearity data to provide a measured flow rate. But Applicant has found that the way the adjustment is typically done includes errors and is otherwise deficient, which results in a measured flow rate that does not match an actual flow rate that is passing through the MFC. In some instances, for example, an actual flow output from the MFC will take a long time to reach a setpoint while a readback of the measured flow is already at the setpoint as shown in FIG. 9.

Accordingly, a need exists for a method and/or apparatus to provide new and innovative features that address the shortfalls of present methodologies in nonlinearity adjustment to a flow signal.

SUMMARY

An aspect may be characterized as a method that includes providing a gas through a thermal mass flow sensor of the mass flow controller and processing a flow sensor signal from the thermal mass flow sensor of the mass flow controller to produce a measured flow signal. The measured flow signal is corrected to produce a corrected flow signal by gradually applying (e.g., gradually changing) non-linearity correction to the measured flow signal when a flow rate of the gas changes. A valve of the mass flow controller is controlled using the corrected flow signal and a setpoint signal.

Another aspect may be characterized as a mass flow controller that includes a main flow path for a gas, a control valve to control a flow rate of the gas through the main flow path, and a thermal mass flow sensor coupled to the main flow path to provide a flow sensor signal indicative of a mass flow rate of the gas. The mass flow controller also includes means for processing the flow sensor signal from the thermal mass flow sensor of the mass flow controller to produce a measured flow signal and means correcting the measured flow signal to produce a corrected flow signal by gradually changing non-linearity correction to the measured flow signal when a flow rate of the gas changes. A control component of the mass flow controller is coupled to the means for correcting and the control valve to control a position of the control valve based upon the corrected flow signal and a setpoint signal.

Yet another aspect may be characterized as a mass flow controller that includes a main flow path for a gas, a control valve to control a flow rate of the gas through the main flow path, and a thermal mass flow sensor coupled to the main flow path to provide a flow sensor signal indicative of a mass flow rate of the gas. A processing portion of the mass flow controller receives and processes the flow sensor signal from the thermal mass flow sensor to produce a measured flow signal. A nonlinear compensator of the mass flow controller includes a non-transitory, tangible processor readable storage medium, encoded with processor executable instructions to produce a corrected flow signal. The instructions include instructions to correct the measured flow signal to produce the corrected flow signal by gradually changing non-linearity correction to the measured flow signal when a flow rate of the gas changes. A control component is coupled to the nonlinear compensator and the control valve to control a position of the control valve based upon the corrected flow signal and a setpoint signal.

DETAILED DESCRIPTION

Figure 1A:
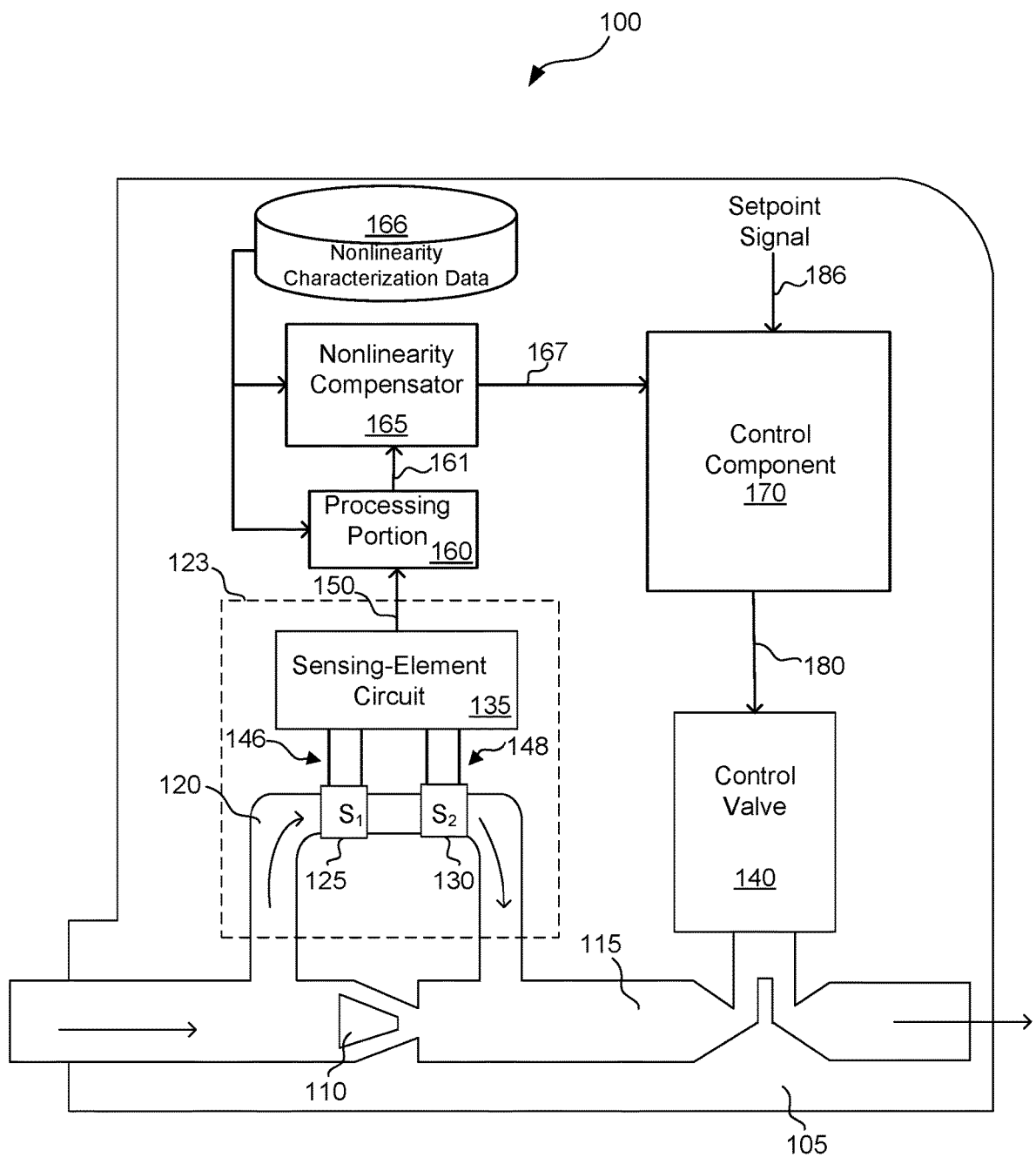
FIG. 1A is a block diagram of a mass flow controller (MFC) that incorporates improved methodologies for nonlinearity adjustment to a measured flow signal.

Referring now to the drawings, FIG. 1 illustrates a mass flow controller (MFC) 100 that incorporates improved methodologies for nonlinearity adjustment to a measured flow signal 161 of the MFC 100. The illustrated arrangement of these components is logical and not meant to be an actual hardware diagram. Thus, the components can be combined, further separated, deleted and/or supplemented in an actual implementation. As one of ordinary skill in the art will appreciate, the components depicted in FIG. 1 may be implemented in hardware, or hardware in combination with firmware and/or software. Moreover, in light of this specification, the construction of each individual component will be well known within the skill of those of ordinary skill in the art.

Throughout this disclosure, examples and embodiments are described in terms of gases being controlled, but it should be recognized that the examples and embodiments are generally applicable to fluids that may be gases or liquids, and the fluids may include a mixture of elements and/or compounds. A liquid for example may be sulfuric acid and a gas may be nitrogen. Depending upon the application, the MFC 100 may deliver a fluid in a gaseous state (e.g., nitrogen) and/or a liquid state (e.g., hydrochloric acid) to, for example, a tool in a semiconductor facility. The MFC 100 in many embodiments is configured to deliver a fluid under high pressure, low temperature, or to different types of containers or vessels.

As depicted, a base 105 of the MFC 100 includes bypass 110 through which a gas flows. Bypass 110 directs a constant proportion of gas through a main path 115 and sensor tube 120. As a consequence, the flow rate of the gas through the sensor tube 120 is indicative of the flow rate of the gas flowing through the main path 115 of the MFC 100.

In this embodiment, the sensor tube 120 is a small-bore tube that is part of a thermal mass flow sensor 123 of the MFC 100. And as shown, sensing elements 125 and 130 are coupled to (e.g., wound around) the outside of sensor tube 120. In one illustrative embodiment, sensing elements 125 and 130 are resistance-thermometer elements (e.g., coils of conductive wire), but other types of sensors (e.g., resistance temperature detectors (RTD) and thermocouples) may also be utilized. Moreover, other embodiments may certainly utilize different numbers of sensors and different architectures for processing the signals from the sensors without departing from the scope of the present invention.

As depicted, sensing elements 125 and 130 are electrically connected to a sensing-element circuit 135. In general, the sensing-element circuit 135 is configured (responsive to signals 146, 148 from the sensing elements 125, 130) to provide a flow sensor signal 150, which is indicative of the flow rate through the sensor tube 120, and hence, indicative of the flow rate through the main path 115 of the MFC 100.

The flow sensor signal 150 is defined by a temperature profile along the sensor tube 120 that affects a temperature difference between the sensing elements 125, 130. The flow sensor signal 150 is non-linear relative to the flow rate through the sensor tube 120 across a range of flow rates: the sensitivity of the flow sensor signal 150 decreases at higher flow rates (as compared to lower flow rates) as shown in FIG. 8.

As shown in FIG. 1, the flow sensor signal 150 may be processed by a processing portion 160 to generate the measured flow signal 161 that is a processed representation of the flow sensor signal 150. For example, the measured flow signal 161 may be a digital representation of the flow sensor signal 150. More specifically, the processing portion 160 may amplify and convert, using an analog to digital converter, the flow sensor signal 150 to a digital representation of the flow sensor signal 150. The processing portion 160 may also include logic to provide a zero-offset adjustment to the flow sensor signal 150 as is known in the prior art.

As shown, the MFC 100 also includes nonlinearity characterization data 166, which may include the steady-state-derived nonlinearity characterization data (stored as calibration coefficients) discussed above in the Background that are known in the prior art. As shown, the processing portion 160 is also configured to utilize the nonlinearity characterization data 166 to adjust the flow sensor signal 150 (as the temperature profile across the thermal mass flow sensor 123 changes) to provide the measured flow signal 161 that does not decrease (relative to actual flow)—under steady state conditions—at higher flow rates.

Figure 8:
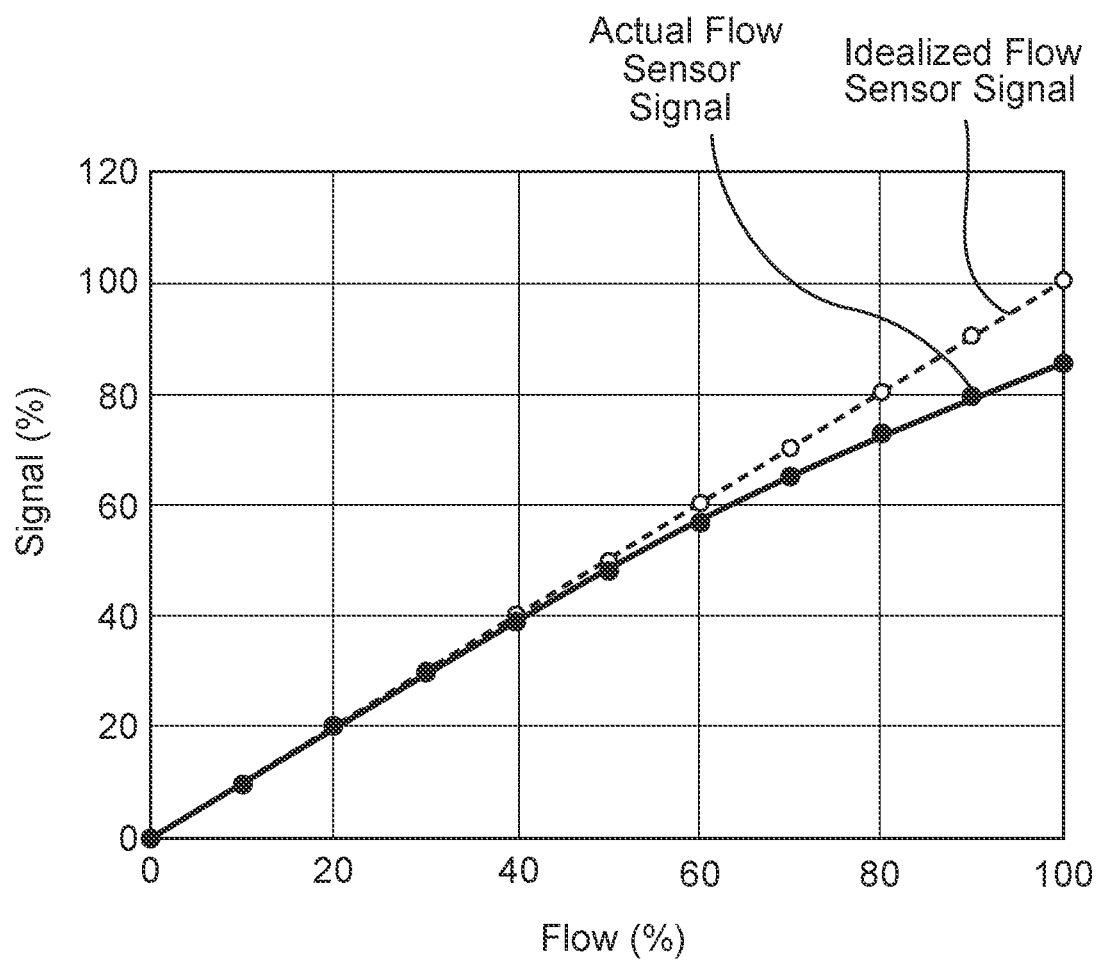
FIG. 8 depicts graphs of an idealized flow sensor signal and an actual flow sensor signal consistent with prior art mass flow controllers.
Figure 9:
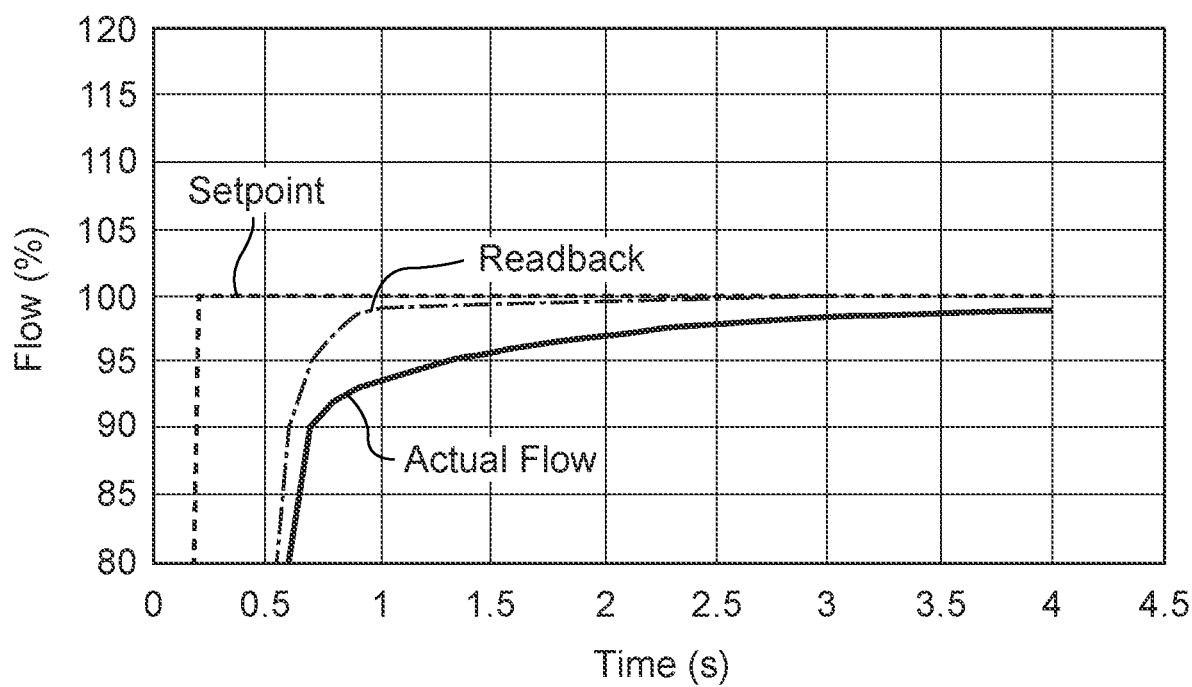
FIG. 9 depicts graphs of a setpoint, flow readback signal, and an actual flow signal consistent with aspects of prior art mass flow controllers.

For example, the calibration coefficients of the nonlinearity characterization data 166 may be generated based upon data that resembles the data graphed in FIG. 8 so that after calibration, for example, the flow sensor signal 150 may be adjusted to compensate for the inaccurate output of the thermal mass flow meter 123. As shown in FIG. 8, for example, the flow sensor signal 150 may be more than 5% inaccurate at a 100% flow rate. Thus, the calibration coefficients may include coefficients to increase the flow sensor signal 150 at the 100% flow rate to match the actual flow.

Although a new temperature distribution quickly occurs across the sensing elements 125, 130 of the flow sensor tube 120 after a change in flow, Applicant has found that a new, stable, temperature profile inside the thermal mass flow sensor 123 does not appear immediately after a flow rate change: it takes some time for heat flow inside components (e.g., an insulator) of the thermal mass flow sensor 123 to change temperature and build a new, stable, temperature profile. A typical time constant of heat-transfer-processes (that occur while the temperature profile is becoming stable) is around two to five seconds in some instances, two to ten seconds in other instances, and in some other instances, longer.

Because the sensitivity of the flow sensor signal 150 (after a flow change) will stabilize only after several seconds, a new nonlinearity correction corresponding to the actual flow (using calibration coefficients generated under stable conditions) applied to the flow sensor signal 150 should not be applied immediately (as it is applied in the prior art). Instead, nonlinearity correction should be changed gradually during a transition time.

In the prior art, the characteristic of the thermal mass flow sensor 123 across a range of flow rates is considered to be a steady state non-linear curve. For example, calibration data is typically obtained for each of a plurality of flow values under steady state conditions where the thermal flow sensor 123 being calibrated has been operating at each flow value for several seconds (e.g., longer than five seconds or longer than ten seconds); thus, the typical prior-art-calibration-data does not characterize transient aspects of the thermal flow sensor signal 150 that occur while a temperature profile within the MFC 100 is stabilizing.

In formal terms, the flow sensor signal 150, s, is described as: $s=F_{NL}(f)$ (Equation 1) where f is an actual flow and $F_{NL}$ is a sensor non-linearity function. A measured flow signal 161 is calculated by applying a function inversed to $F_{NL}(f)$ to the flow sensor signal 150: $f_m = F_{NL}^{-1}(s)$ (Equation 2), where s is the flow sensor signal 150 and $f_m$ is the measured flow signal 161. If, for example, the flow changes from zero to 100%, then immediately, a nonlinearity correction for a 100% flow rate is applied to the flow sensor signal 150. But due to the thermal nature of a mass flow controller, the flow sensor signal 150 does not exhibit the same sensitivity to the actual flow (the same nonlinearity) after one second that it does after 10 seconds.

After a flow change from 0% to 100%, it takes several seconds for the temperature profile and heat flow inside the sensor 123 to stabilize at the 100% flow rate. During that time, the sensitivity of the flow sensor signal 150 is also changing; thus, the application of steady-state-derived nonlinear calibration data (of a typical prior art mass flow controller) produces inaccurate results. To produce a more accurate flow signal, the correction methodologies described herein take this into account by modelling this gradual sensitivity change.

Figure 2:
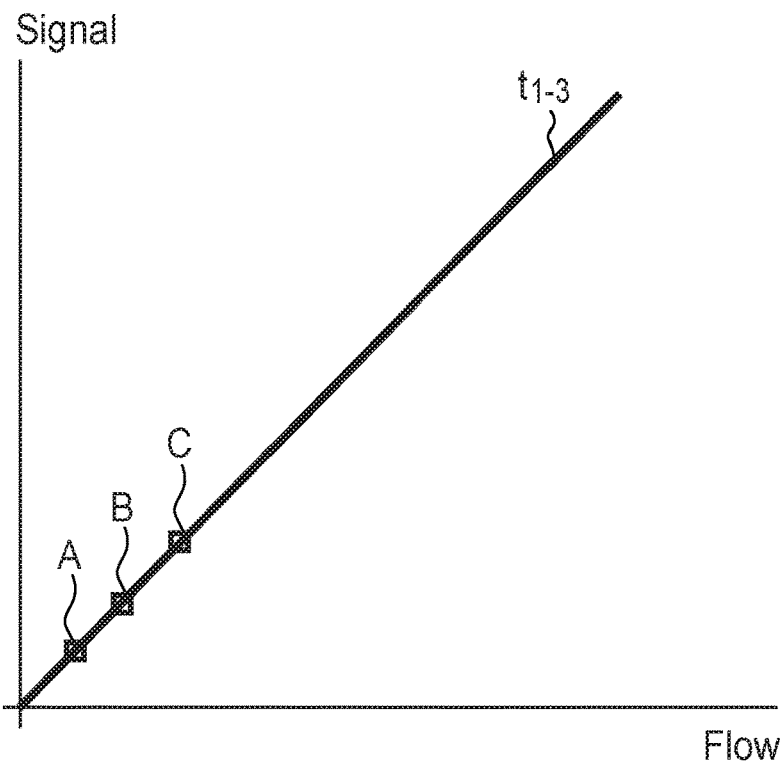
FIG. 2 is a graph depicting a sensitivity of a sensor signal at low flows.
Figure 3:
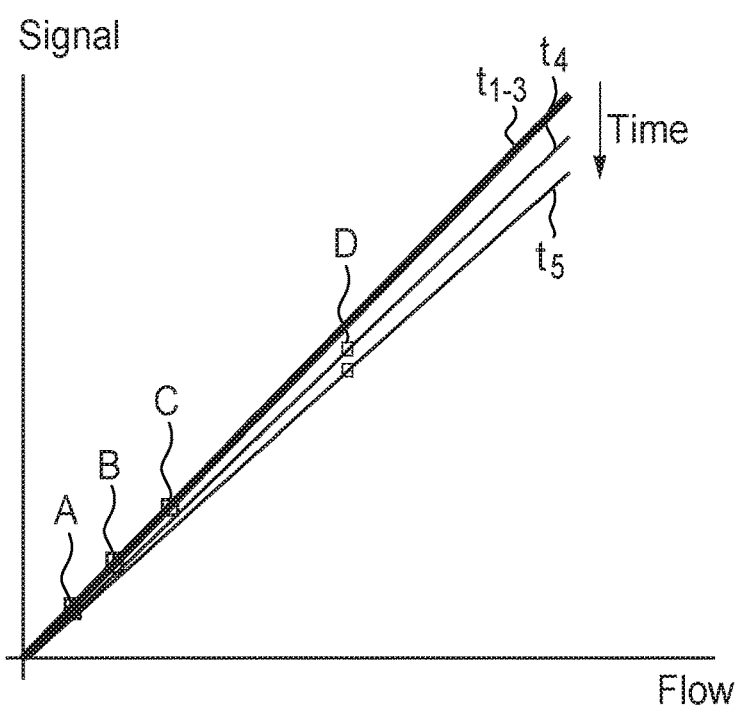
FIG. 3 is a graph depicting a sensitivity of the sensor signal at higher flows than depicted in FIG. 2.
Figure 4:
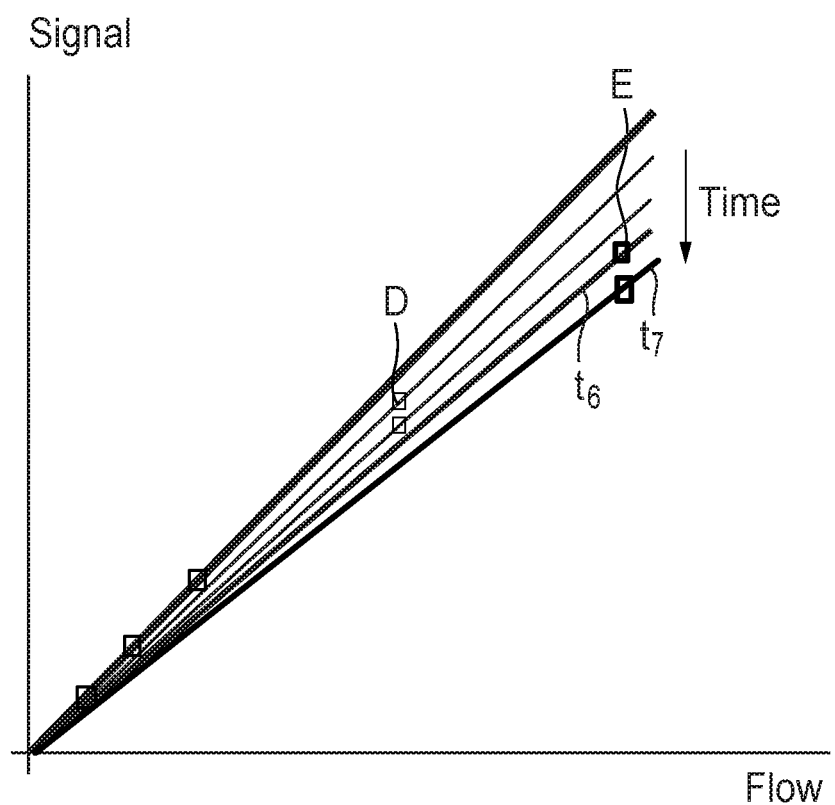
FIG. 4 is a is a graph depicting a sensitivity of the sensor signal at higher flows than depicted in FIG. 3.

Referring to FIGS. 2-4 for example, shown are representations of how the sensitivity of the flow sensor signal 150 gradually stabilizes after a setpoint change over time. Shown in FIG. 2 for example, at very low flows (shown by points A, B, and C), the sensitivity of the flow sensor signal 150 is substantially constant at three corresponding points in time t1 (point A), t2 (point B), and t3 (point C).

But when there is a change (as shown in FIG. 3) in the flow rate from point C to point D (where point D denotes a higher flow rate than point C), the sensitivity of the flow sensor signal 150 decreases from a time t4 to a subsequent time t5. Thus, for the same actual flow at point D, the flow sensor signal 150 at time t5 will be less than the flow sensor signal 150 at the time t4.

And as shown in FIG. 4, when the mass flow rate again increases from the mass flow rate at point D to reach the mass flow rate denoted by point E at a time, t6, the sensitivity of the flow sensor signal 150 decreases from the time t6 until the flow sensor signal 150 stabilizes (with a lower sensitivity) at a time t7. In short, FIGS. 2-4 show the sensitivity of the flow sensor signal 150 is substantially constant during changes between low flow rates (e.g., the flow rates at points A, B, and C), and that when there is a flow rate change to a higher flow rate (e.g., the flow rate denoted by point D at a time t4), the sensitivity of the flow sensor signal 150 decreases for a few seconds before stabilizing.

Thus, the prior art approaches that do not compensate for the few transient seconds of decreasing sensitivity of the flow sensor signal 150 (e.g., after the mass flow rate reaches a high flow rate after a change in the flow rate) will produce an inaccurate measure of the mass flow rate (during the transient time after the change in the flow rate). Moreover, a similar problem exists after a change from a relatively high mass flow rate (e.g., 90%) to another relatively high mass flow rate (e.g., 60%) because when the flow rate is decreasing, the sensitivity of the flow sensor signal 150 will increase gradually. The effects of increasing sensitivity may be not noticeable when the final flow rate is relatively low (e.g., such as at points A, B, C), but when transitioning from the flow rate at point E to the flow rate at point D, there may be a large measured flow error due to instantaneous non-linearity correction rather than gradual correction.

To overcome the deficiency in the prior art, in the embodiment depicted in FIG. 1, the measured flow signal 161 is fed to a nonlinearity compensator 165, which provides nonlinearity correction gradually during the transition time (e.g., from the time t6 to t7) after a flow rate changes to a new flow rate (e.g., the flow rate depicted by point E). As shown, the correction provided by the nonlinearity compensator 165 results in a corrected flow signal 167 that is provided to a control component 170, and the control component 170 in this embodiment is part of a control system that includes sensing elements 125 and 130, sensing-element circuit 135, the processing portion 160, the nonlinearity compensator 165 and a setpoint signal 186.

Although FIG. 1 depicts the nonlinearity compensator 165 directly coupled to the control component 170, it should be recognized that additional processing components may be disposed between the nonlinearity compensator 165 and the control component 170. For example, the corrected flow signal 167 may be further modified in response to pressure and/or temperature measurements before being provided to the control component 170. As another example, the corrected flow signal 167 may be modified based upon the constituent components of the gas being controlled. Additional types of processing may also be carried out on the corrected flow signal 167 without departing from the scope of the present invention.

The control component 170 is generally configured to generate a control signal 180 to control a position of a control valve 140 to provide a flow rate based upon the setpoint signal 186. The control valve 140 may be realized by a piezoelectric valve or solenoid valve, and the control signal 180 may be a voltage (in the case of a piezoelectric valve) or current (in the case of a solenoid valve).

For example, embodiments of the nonlinearity compensator 165 described herein compensate for the transient thermal aspects that occur just after a change in the flow rate. More specifically, to achieve this compensation, the nonlinearity compensator 165 makes a gradual adjustment to the measured flow signal 161 after a change in flow rate.

In terms of a more formal description, a "sensor sensitivity function" $F_S$ is introduced: $F_S(f) = F_{NL}(f)/f$ (Equation 3), where $F_{NL}$ is the sensor nonlinearity function representing mass flow sensor non-linearity calibration data 166 and f is a flow rate. For a specific flow rate, f, the function represents a slope of a straight line coming through an origin and a point at the function $F_{NL}(f)$ corresponding to the flow rate, f. Then, the flow sensor signal 150 is defined as $s = f * F_S(f)$ (Equation 4). According to an aspect various embodiments, when the actual flow, f, is changing fast, the "f" factor of the Equation 4 results in a corresponding fast change of the flow sensor signal 150 (representing a fast change of temperature distribution across the sensing elements 125 and 130 of the thermal mass flow sensor 123), while the sensitivity function $F_S(f)$ is changing gradually (representing slow thermal processes inside the thermal mass flow sensor 123). When a new flow sensor signal, s, 150 is received by the processing portion 160, the measured flow signal, $f_m$, 161 is calculated by the processing portion 160 according to Equation 2.

Figure 1B:
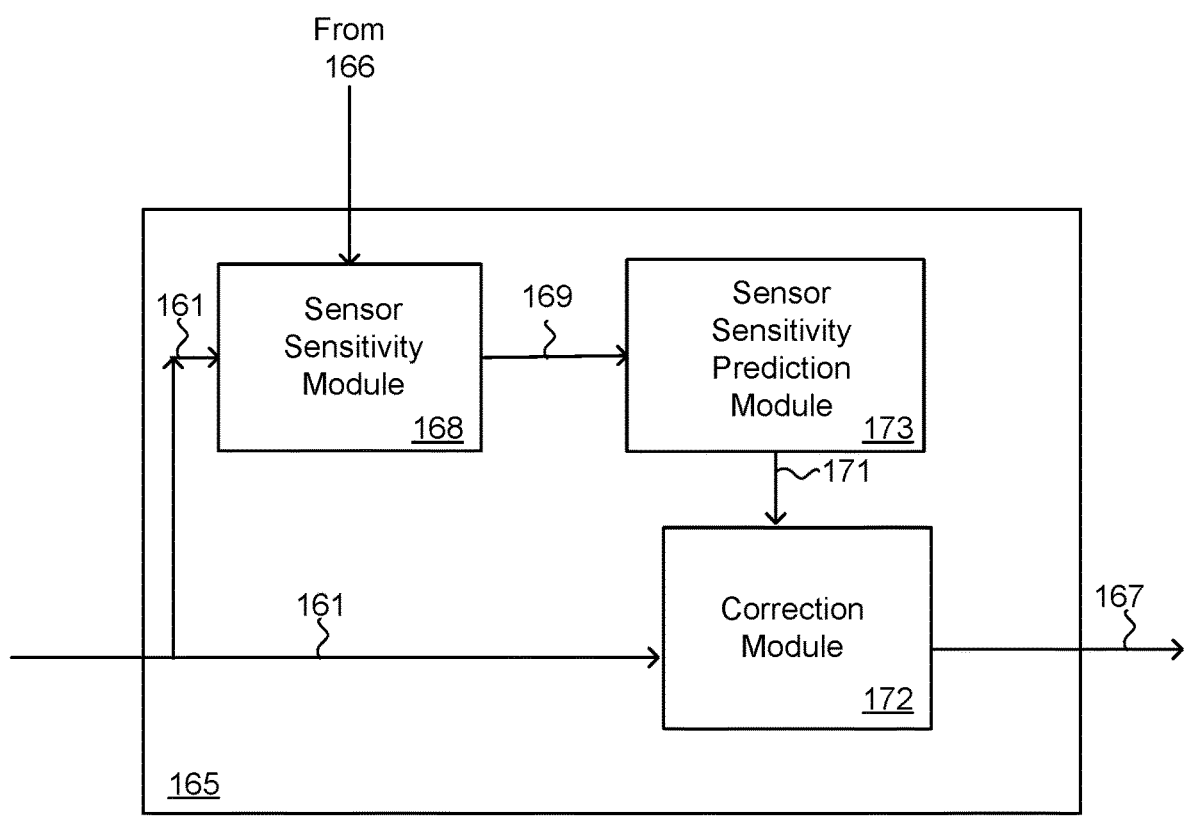
FIG. 1B is a block diagram depicting an exemplary embodiment of the nonlinearity compensator of FIG. 1A.
Figure 5A:
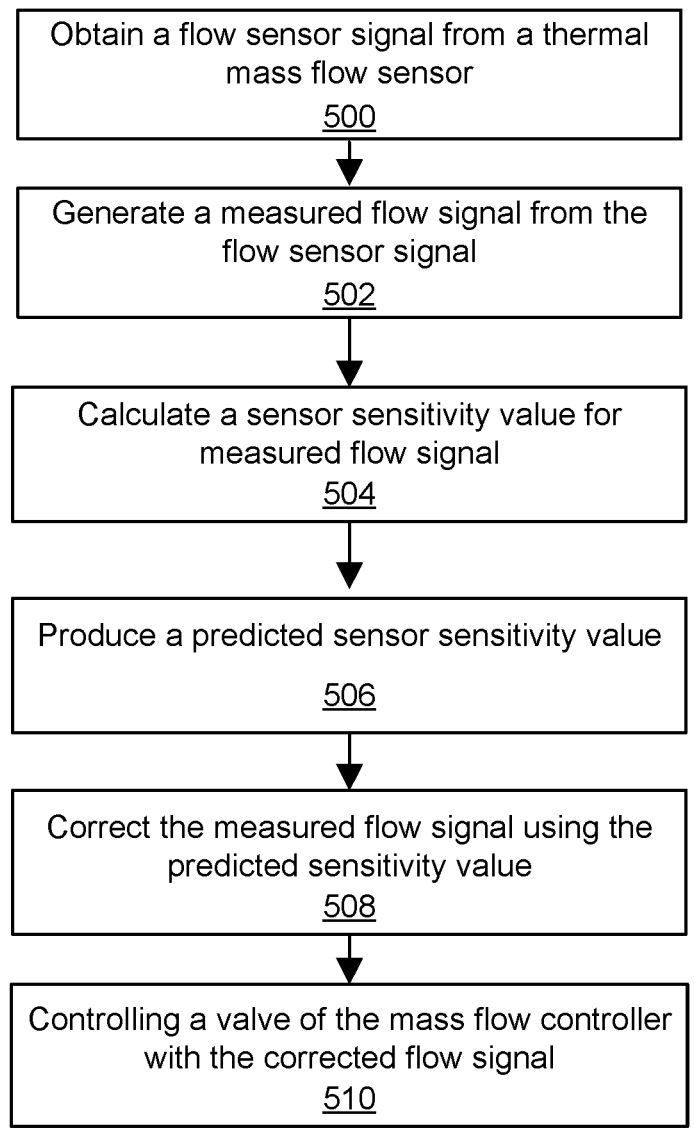
FIG. 5A is a flowchart depicting an exemplary method that may be traversed in connection with embodiments disclosed herein.

Referring next to FIG. 1B, shown is block diagram depicting an exemplary embodiment of the nonlinearity compensator 165. While referring to FIG. 1B, simultaneous reference is made to FIG. 5A, which is a flowchart depicting a method that may be traversed in connection with embodiments disclosed herein. When a flow sensor signal, s, 150 is obtained (Block 500) by the processing portion 160, the measured flow signal, $f_m$, 161 is generated (Block 502) by the processing portion 160 according to Equation 2.

As shown, a sensor sensitivity module 168 calculates a sensor sensitivity value 169 with Equation 3 for the measured flow signal $f_m$ (Block 504). The sensor sensitivity module 168 also receives non-linearity calibration data 166 (representing the sensor nonlinearity function $F_{NL}$) to carry out Equation 3. Then a sensor sensitivity prediction module 173 uses the sensor sensitivity value 169 to produce a predicted sensor sensitivity value, $S_p$, 171 (Block 506). More specifically, the predicted sensor sensitivity value, $S_p$, 171 may be calculated based upon a physical model of the thermal mass flow sensor 123 and/or empirical data.

In many implementations, a new value, $S_{p\_new}$, of the predicted sensor sensitivity value 171 is calculated on an ongoing basis based upon a prior value, $S_{p\_prior}$, of the predicted sensor sensitivity value 171 and a current sensor sensitivity value, $S_c$, 169, and the predicted sensor sensitivity value, $S_p$, gradually changes toward the current sensor sensitivity value, $S_c$, 169. The rate of the change of the predicted sensor sensitivity value, $S_p$, may be proportional to a difference between the predicted sensor sensitivity value, $S_p$, and the current sensor sensitivity value, $S_c$, 169. The new value, $S_{p\_new}$, may be obtained, for example, using the following equation, which may be calculated at each sampling moment: $S_{p\_new} = k \cdot S_c + (1-k) \cdot S_{p\_prior}$ (Equation 5), where $S_{p\_new}$ is the new value of the predicted sensor sensitivity value 171 after calculating Equation 5; $S_{p\_prior}$ is the prior value of the predicted sensor sensitivity value 171 before calculating Equation 5; $k = t_s/T$, where $t_s$ is a sampling interval (an interval between sampled flow rates); and T is a time constant of thermal processes inside the sensor (where $t_s$ and T are in seconds). With this implementation, if the flow changed instantaneously from a stable flow rate, $f_1$, to a new flow rate, $f_2$, the predicted sensor sensitivity value, $S_p$, will change exponentially from an initial value $S_1 = F_S(f_1)$ to a final value $S_2 = F_S(f_2)$, with a time constant T: $S_p(t) = S_2 + (S_1 - S_2) \cdot \exp(-t/T)$. The time constant, T, may vary based upon $f_1$ and $f_2$.

As shown, a correction module 172 then corrects the measured flow signal 161 to produce the corrected flow signal 167 (Block 508). The correction module 172 may produce the corrected flow sensor signal 167 as follows: $f_c = f_m \cdot S_p$ where $f_c$ is the corrected flow signal 167, $S_p$ is the predicted sensor sensitivity value, and $f_m$ is the measured flow value 161. The corrected flow signal 167 may then be used to control a valve of the mass flow controller (Block 510).

Figure 5B:
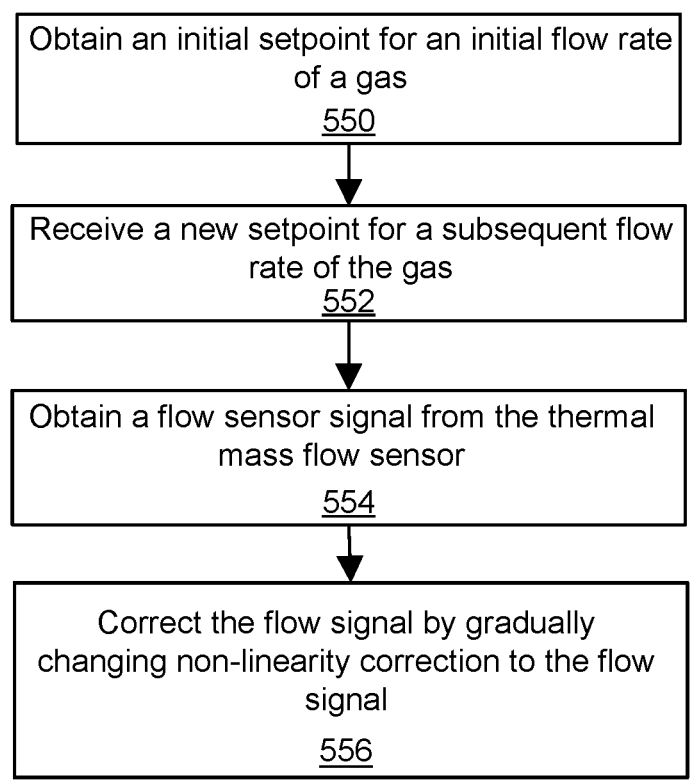
FIG. 5B is another flowchart depicting another exemplary method that may be traversed in connection with embodiments disclosed herein.

Referring next to FIG. 5B, it is a flowchart depicting a method that may be performed in connection with embodiments disclosed herein when there is a change in a setpoint that causes a change in flow rate. As shown, an initial setpoint, $sp_1$, for an initial flow rate of a gas is obtained (Block 550). This initial setpoint, $sp_1$, may correspond to an initial flow rate, $f_1$, at which the mass flow controller 100 has been operating for some time (e.g., seconds or minutes). For purposes of example, the initial setpoint, $sp_1$, may be 50% of a maximum setpoint of the mass flow controller 100. When a new setpoint, $sp_2$, is received via the setpoint signal 186, the flow rate will change to a subsequent flow rate, $f_2$, (Block 552). To continue the example, the new setpoint, $sp_2$, may be 100% of the maximum setpoint of the mass flow controller 100.

As shown, the flow sensor signal 150 from the thermal flow sensor 123 is obtained (Block 554), and the flow sensor signal 150 is corrected by gradually changing non-linearity correction to the flow sensor signal 150 (Block 556). In the embodiment depicted in FIG. 1, the flow sensor signal 150 is first processed (including conversion from an analog signal to a digital signal) by the processing portion 160 to obtain the measured flow signal 161, and the measured flow signal 161 is corrected by the nonlinearity compensator 165 by gradually changing non-linearity correction to the measured flow signal 161 to obtain the corrected flow signal 167.

Thus, the correction (Block 556) may include several operations, but unlike the prior art, a sensitivity of the thermal mass flow sensor 123 (e.g., obtained from characterization data such as is shown in FIG. 8) is adjusted gradually during a transient period while the temperature profile is stabilizing after a change in the flow rate. As discussed above, the result is the sensor sensitivity value may change exponentially from an initial value $S_1 = F_S(f_1)$, at the initial flow rate, $f_1$, to a subsequent value $S_2 = F_S(f_2)$, at the subsequent flow rate, $f_2$, with time constant T: $S_p(t) = S_2 + (S_1 - S_2) \cdot \exp(-t/T)$. The time constant, T, may vary based upon the initial flow rate, $f_1$, and the subsequent flow rate, $f_2$.

Figure 6:
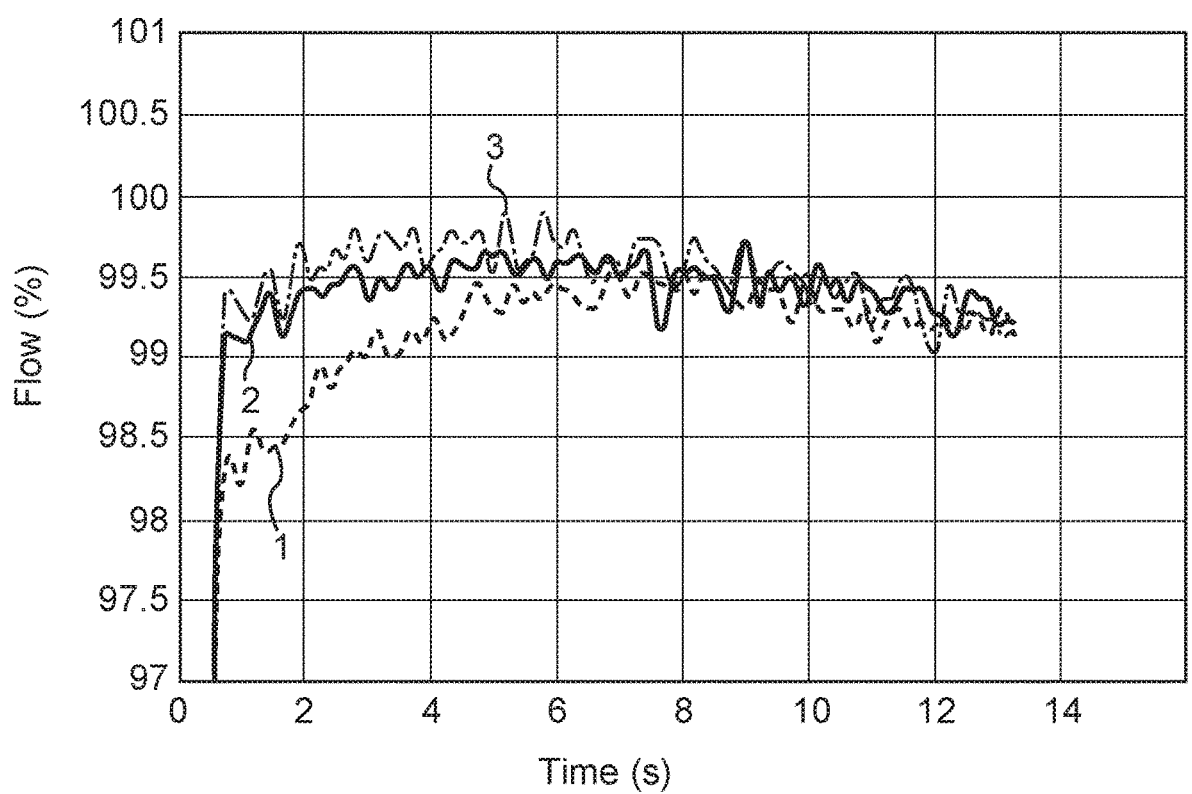
FIG. 6 depicts three graphs of actual flow rates versus time where the MFC of FIG. 1 is controlling the flow after a new setpoint.

Advantages of embodiments described herein, and the method depicted in FIG. 5B, are shown with reference to FIG. 6. Shown in FIG. 6 are three graphs of actual flow rates versus time where the MFC 100 is controlling the flow after a new setpoint, $sp_2$, change to 100% from a lower initial setpoint, $sp_1$. Line 1 shows an actual flow rate where the MFC 100 is controlling a flow rate using an uncorrected measured flow signal 161. As shown, during the period while the temperature profile is stabilizing (between about 0.7 seconds and 8 seconds), the actual flow rate is too low because the measured flow rate is too high.

Line 2 shows an actual flow rate where the MFC is controlling a flow rate using the corrected flow signal 167 with a time constant, T, of 1 second. Line 3 shows an actual flow rate where the MFC is controlling a flow rate using the corrected flow signal 167 with a time constant, T, of 2 seconds.

The three different graphs are initially very similar and quickly rise to about 98%, which is consistent with a temperature profile across the sensor tube 120 quickly changing. But after reaching about 98% (at about 0.7 seconds), the temperature profile of the thermal mass flow sensor 123 slowly changes until stabilizing about 8 seconds after the setpoint change.

Figure 7:
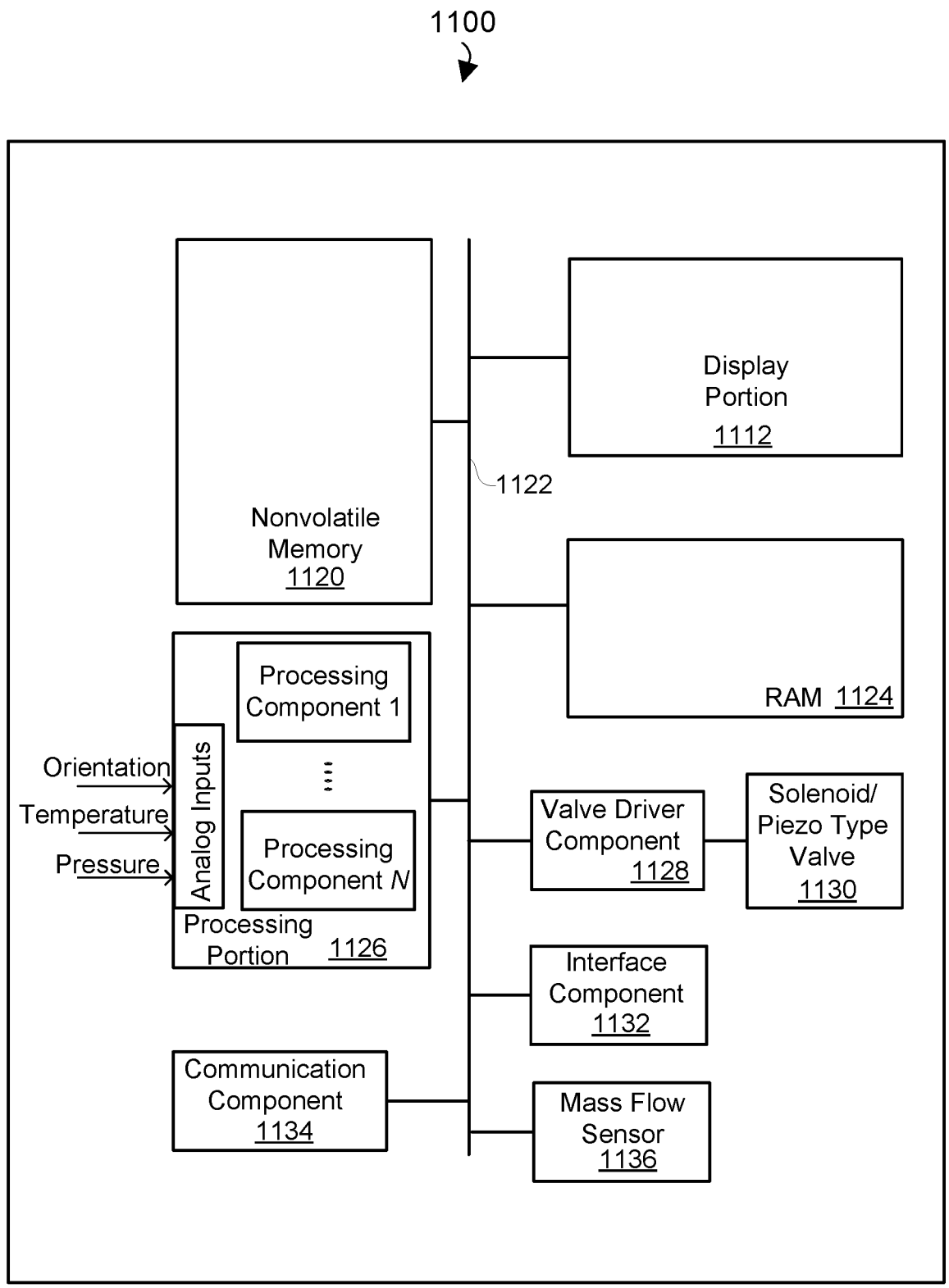
FIG. 7 is a block diagram depicting physical components of the MFC that may be used to realize aspects of the MFC depicted in FIG. 1.

Referring next to FIG. 7, shown is a block diagram 1100 depicting physical components that may be utilized to realize the MFC 100 described with reference to FIG. 1. As shown, a display portion 1112, and nonvolatile memory 1120 are coupled to a bus 1122 that is also coupled to random access memory ("RAM") 1124, a processing portion (which includes N processing components) 1126, a valve driver component 1128 that is in communication with a solenoid or piezo type valve 1130, an interface component 1132, a communication component 1134, and a mass flow sensor 1136. Although the components depicted in FIG. 7 represent physical components, FIG. 7 is not intended to be a hardware diagram; thus, many of the components depicted in FIG. 7 may be realized by common constructs or distributed among additional physical components. Moreover, it is certainly contemplated that other existing and yet-to-be developed physical components and architectures may be utilized to implement the functional components described with reference to FIG. 7.

The display portion 1112 generally operates to provide a presentation of content to a user, and in several implementations, the display is realized by an LCD or OLED display. For example, the display 1112 may provide an indicated flow as a graphical or numeric representation of the corrected flow signal 167. In general, the nonvolatile memory 1120 functions to store (e.g., persistently store) data and executable code including code that is associated with the functional components depicted in FIGS. 1 and 1A. In some embodiments for example, the nonvolatile memory 1120 includes bootloader code, software, operating system code, file system code, and code to facilitate the implementation of one or more portions of the components discussed in connection with FIGS. 1 and 1A. In alternative implementations dedicated hardware may be utilized to implement one or more components depicted in FIGS. 1 and 1A. For example, a digital signal processor may be utilized to realize the nonlinearity compensator 165 depicted in FIGS. 1 and 1A.

In many implementations, the nonvolatile memory 1120 is realized by flash memory (e.g., NAND or ONENAND memory), but it is certainly contemplated that other memory types may be utilized. Although it may be possible to execute the code from the nonvolatile memory 1120, the executable code in the nonvolatile memory 1120 is typically loaded into RAM 1124 and executed by one or more of the N processing components in the processing portion 1126. As shown, the processing component 1126 may receive analog temperature and pressure inputs that are utilized by the functions carried out by the control component 170.

The N processing components in connection with RAM 1124 generally operate to execute the instructions stored in nonvolatile memory 1120 to effectuate the functional components depicted in FIGS. 1 and 1A.

The interface component 1132 generally represents one or more components that enable a user to interact with the MFC 100. The interface component 1132, for example, may include a keypad, touch screen, and one or more analog or digital controls, and the interface component 1132 may be used to translate an input from a user into the setpoint signal 186. And the communication component 1134 generally enables the MFC 100 to communicate with external networks and devices including external processing tools. For example, an indicated flow may be communicated to external devices via the communication component 1134. One of ordinary skill in the art will appreciate that the communication component 1134 may include components (e.g., that are integrated or distributed) to enable a variety of wireless (e.g., WiFi) and wired (e.g., Ethernet) communications.

The mass flow sensor 1136 depicted in FIG. 7 depicts a collection of components known to those of ordinary skill in the art to realize the thermal mass flow sensor 123 shown in FIG. 1A. These components may include sensing elements, amplifiers, analog-to-digital conversion components, and filters.

Those of skill in the art will appreciate that the information and signals discussed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. In addition, the various illustrative logical blocks, modules, circuits, and algorithm steps described in connection with the embodiments disclosed herein may be implemented by other alternative components than those depicted in FIG. 7.

Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for controlling a mass flow controller, the method comprising:
    providing a gas through a thermal mass flow sensor of the mass flow controller;
    processing a flow sensor signal from the thermal mass flow sensor of the mass flow controller to produce a measured flow signal by applying steady-state-derived nonlinearity characterization data to adjust the flow sensor signal;
    obtaining a current sensor sensitivity value based on the measured flow signal and the nonlinearity characterization data;
    updating a predicted sensor sensitivity value based on the current sensor sensitivity value and a prior predicted sensor sensitivity value;
    correcting the measured flow signal to produce a corrected flow signal by gradually changing, over a transition time period while a temperature profile of the thermal mass flow sensor is stabilizing and based at least in part on the predicted sensor sensitivity value, a non-linearity correction applied to the measured flow signal when a flow rate of the gas changes; and
    controlling a valve of the mass flow controller using the corrected flow signal and a setpoint signal.

2. The method of claim 1, wherein
    the correcting includes obtaining a product of the measured flow signal and the predicted sensor sensitivity value, $S_p$, while the predicted sensor sensitivity value, $S_p$, gradually changes toward the current sensor sensitivity value, $S_c$.

3. The method of claim 2, wherein a new value, $S_{p\_new}$, of the predicted sensor sensitivity value, $S_p$, is calculated as $S_{p\_new}=k*S_c+(1-k)*S_{p\_prior}$, where $S_{p\_prior}$ is the prior value of the predicted sensor sensitivity value, $S_p$, where $k=t_s/T$, where $t_s$ is a sampling interval between obtaining flow rates and T is a time constant.

4. The method of claim 3, wherein the time constant, T, is two seconds or less.

5. The method of claim 1, wherein gradually changing includes adjusting a sensor sensitivity function that is used to adjust the measured flow signal for up to 10 seconds.

6. The method of claim 5 wherein gradually changing includes adjusting a sensor sensitivity function that is used to adjust the measured flow signal for up to 8 seconds.

7. A mass flow controller comprising:
    a main flow path for a gas;
    a control valve to control a flow rate of the gas through the main flow path;
    a thermal mass flow sensor coupled to the main flow path to provide a flow sensor signal indicative of a mass flow rate of the gas;
    means for processing the flow sensor signal from the thermal mass flow sensor of the mass flow controller to produce a measured flow signal by applying steady-state-derived nonlinearity characterization data to adjust the flow sensor signal;
    means for obtaining a current sensor sensitivity value based on the measured flow signal and the steady-state-derived nonlinearity characterization data;
    means for updating a predicted sensor sensitivity value based on the current sensor sensitivity value and a prior predicted sensor sensitivity value;
    means for correcting the measured flow signal to produce a corrected flow signal by gradually changing, over a transition time period while a temperature profile of the thermal mass flow sensor is stabilizing and based at least in part on the predicted sensor sensitivity value, a non-linearity correction applied to the measured flow signal when a flow rate of the gas changes; and a control component coupled to the means for correcting and the control valve to control a position of the control valve based upon the corrected flow signal and a setpoint signal.

8. The mass flow controller of claim 7, wherein
the means for correcting includes means for obtaining a product of the measured flow signal and the predicted sensor sensitivity value, $S_p$, while the predicted sensor sensitivity value, $S_p$, gradually changes toward the current sensor sensitivity value, $S_c$.

9. The mass flow controller of claim 8, wherein a new value, $S_{p\_new}$, of the predicted sensor sensitivity value, $S_p$, is calculated as $S_{p\_new}=k*S_c+(1-k)*S_{p\_prior}$, where $S_{p\_prior}$ is the prior value of the predicted sensor sensitivity value, $S_p$, where $k=t_s/T$, where $t_s$ is a sampling interval between obtaining flow rates and T is a time constant.

10. The mass flow controller of claim 9, wherein the time constant, T, is two seconds or less.

11. The mass flow controller of claim 7, wherein the means for gradually changing includes means for adjusting a sensor sensitivity function that is used to adjust the measured flow signal for up to 10 seconds.

12. The mass flow controller of claim 11 wherein the means for gradually changing includes means for adjusting a sensor sensitivity function that is used to adjust the measured flow signal for up to 8 seconds.

13. A mass flow controller comprising:
a main flow path for a gas;
a control valve to control a flow rate of the gas though the main flow path;
a thermal mass flow sensor coupled to the main flow path to provide a flow sensor signal indicative of a mass flow rate of the gas;
a processing portion to receive and process the flow sensor signal from the thermal mass flow sensor to produce a measured flow signal by applying steady-state-derived nonlinearity characterization data to adjust the flow sensor signal;
a nonlinear compensator including a non-transitory, tangible processor readable storage medium, encoded with processor executable instructions to produce a corrected flow signal, the instructions comprising instructions to:
obtain a current sensor sensitivity value based on the measured flow signal and the steady-state-derived nonlinearity characterization data;
update a predicted sensor sensitivity value based on the current sensor sensitivity value and a prior predicted sensor sensitivity value;
correct the measured flow signal to produce a corrected flow signal by gradually changing, over a transition time period while a temperature profile of the thermal mass flow sensor is stabilizing and based at least in part on the predicted sensor sensitivity value, a non-linearity correction applied to the measured flow signal when a flow rate of the gas changes; and
a control component coupled to the nonlinear compensator and the control valve to control a position of the control valve based upon the corrected flow signal and a setpoint signal.

14. The mass flow controller of claim 13, wherein
the instructions to correct includes instructions to obtain a product of the measured flow signal and the predicted sensor sensitivity value, $S_p$, while the predicted sensor sensitivity value, $S_p$, gradually changes toward the current sensor sensitivity value.

15. The mass flow controller of claim 14, wherein a new value, $S_{p\_new}$, of the predicted sensor sensitivity value, $S_p$, is calculated as $S_{p\_new}=k*S_c+(1-k)*S_{p\_prior}$, where $S_{p\_prior}$ is the prior value of the predicted sensor sensitivity value, $S_p$, where $k=t_s/T$, where $t_s$ is a sampling interval between obtaining flow rates and T is a time constant.

16. The mass flow controller of claim 15, wherein the time constant, T, is two seconds or less.

17. The mass flow controller of claim 13, wherein gradually changing includes adjusting a sensor sensitivity function that is used to adjust the measured flow signal for up to 10 seconds.

18. The mass flow controller of claim 17 wherein gradually changing includes adjusting a sensor sensitivity function that is used to adjust the measured flow signal for up to 8 seconds.

* * * * *